Figure 1:
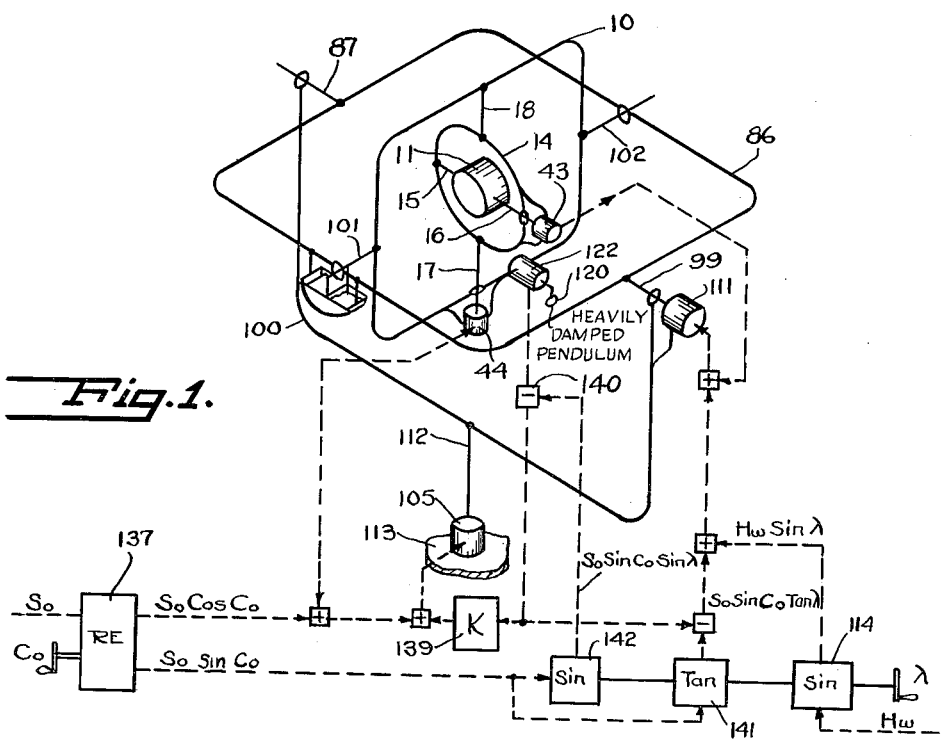

Aug. 21, 1962   R. Y. MINER ET AL   3,049,808
GYRO COMPASS
Filed May 28, 1959

INVENTORS.
RICHARD Y. MINER
CHARLES T. DAVENPORT
FREDERICK J. KREITNER
BY
Raymond A. Paquin
ATTORNEY.

United States Patent Office

3,049,808
Patented Aug. 21, 1962

3,049,808
GYRO COMPASS
Richard Y. Miner, Port Washington, Charles T. Davenport, Manhasset, and Frederick J. Kreitner, Roslyn Heights, N.Y., assignors to American Bosch Arma Corporation, a corporation of New York
Filed May 28, 1959, Ser. No. 816,411
5 Claims. (Cl. 33—226)

This invention relates to gyro compasses and has particular reference to gyro compasses especially adapted for use in aircraft.

The gyro compass has been refined in the last half century to the extent that it is now small enough for installation on aircraft. However, the relatively high speed of aircraft, with respect to the speed of naval or land vehicles, necessitates certain changes and corrections which are not used in the gyro compasses familiar in the art.

The pendulum reference is used as before to cause the gyro spin axis to settle on the meridian but, as is well known, horizontal accelerations of the pendulum pivot result in gyro compass errors. Exact compensation for the acceleration effect on the pendulum is normally provided by an equal and opposite counter force applied to the pendulum, or by the subtraction of a computed signal equal to the acceleration effect on the pendulum. Either of these approaches is undesirable for aircraft use, where the auxiliary equipment for any apparatus must be kept to a bare minimum. To this end the compass of the present invention uses a heavily damped pendulum to reduce the effects of short time and periodic accelerations, such as buffeting, for example, and a pendulum cut-out to eliminate pendulum control of the gyroscope during excessive or prolonged accelerations. In this cut-out period the gyroscope is a free gyro to which the earth rotation and vehicle speed corrections are applied and the gyro will continue to indicate the true north, with an error dependent only upon the drift rate of the gyro and the length of time the pendulum is disconnected.

Disconnection of the pendulous reference from gyroscopic instruments is not new as such, but it has not been used in gyro compasses heretofore in the manner of this application, nor has the combined heavy damping and cut-off feature been used previously on gyro compass pendulums.

Furthermore, in the normal operation of aircraft the aircraft constantly accelerates or decelerates with respect to earth during ascent or descent as the indicated air speed is kept constant. This small-valued acceleration causes only a slight offset of the pendulum but, over an extended period of time, causes significant compass error unless compensated. Again, to minimize equipment the pendulum is cut off from the gyro whenever the rate of climb exceeds a given threshhold value so that the gyro acts as a free gyro, with earth rotation and vehicle speed corrections applied, during this period.

Figure 2:
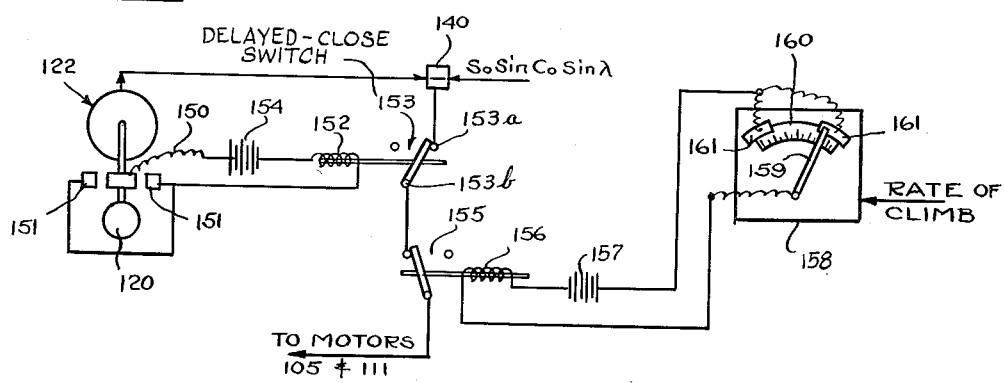

For a better understanding of the invention and other features incorporated in certain preferred embodiments, reference may be had to the accompanying diagrams, in which:

FIG. 1 is a schematic representation of the construction of a gyro compass embodying the present invention; and FIG. 2 illustrates a particular circuit for implementing the present invention in FIG. 1.

With reference now to FIG. 1 of the drawings which is substantially the same as FIG. 8 of copending patent application 479,144, filed December 31, 1954 now U.S. Patent 2,896,455 issued July 28, 1959 with the addition of the present invention to the appropriate places and deletion of those parts not necessary to the understanding of the present invention. Reference to the above identified patent application will give a detailed understanding of FIG. 1 but, briefly, it is as follows:

A horizontal spin axis gyro 11 is suspended by torsion wires 15, 16 in the gimbal frame 14, which is in turn supported in the gimbal frame 10 by the torsion wires 17, 18. This is a schematic representation whereas the gimbal frame 10 is in reality a tank and the gimbal frame 14 and gyro 11 are actually suspended in neutral buoyancy in a fluid carried by tank 10. Also for descriptive purposes, wires 16 and 17 are shown as rigid shafts in order to actuate their respective pickoffs 43, 44 while the actual embodiment uses pickoffs of a different type. The tank 10 is supported by shafts 101, 102 in a horizontal gimbal ring 86 which is in turn supported by shafts 87, 99 in the yoke 100. The yoke 100 is attached to the structural frame 13 of the vehicle and is rotatable in azimuth with respect thereto. Follow-up motor 111 carried by yoke 100 drives shaft 99 and thereby drives the gimbal frame 14 with respect to the gyro 11 to twist wire 15 and thereby apply torque to the gyro 11 about a horizontal axis. The angular displacement between gyro 11 and gimbal frame 14 is sensed by pickoff 43. Similarly motor 105 drives gimbal frame 10 about gyro 11 to twist the wire 18 to apply torque to the gyro about a vertical axis. The angular displacement between the gyro 11 and frame 10 is sensed by pickoff 44.

The twist in the wires 15 and 18 is controlled by the outputs of the pickoff devices 43, 44 where the signal from each pickoff is combined with signals proportional to the desired torque and the combined signal energizes the follow-up motors 105, 111 until the pickoff signal is sufficient to deenergize the motors. The "north steaming correction," proportional to $So \cos Co$, where $So$ is the speed of the vehicle and $Co$ is its course, is applied about the vertical axis by motor 105 to which one component of the energizing signal, proportional to $So \cos Co$, is available from resolver 137. Also applied about the vertical axis by motor 105 is a damping signal from pendulum pickoff 122 which is carried by tank 10. The signal from pickoff 122 is transmitted through voltage divider 139 so that only a small fraction of the pendulum signal is applied about the vertical.

The gyro compass is caused to settle on the meridian by applying the pendulum output to the horizontal follow-up motor 111. Also applied about the horizontal axis is the lattitude correction signal, $H\omega \sin \lambda$ available from resolver 114 and the east speed correction $So \sin Co \tan \lambda$ available from resolver 137 through potentiometer cam 141. The east speed correction is required in aircraft since the speeds are considerably higher than on land vehicles and effectively change the speed of rotation of the earth. That is, an easterly velocity means that the vehicle is traveling around the earth's axis at a rate other than that caused by earth's rotation alone. The effect on the compass is identical to that of an error in the latitude correction and is corrected by a horizontal torque proportional to $$\frac{So \sin Co}{\cos \lambda} \sin \lambda$$

or $So \sin Co \tan \lambda$.

Also, in aircraft the effect of Coriolis acceleration may contribute to errors, whereas Coriolis acceleration effect on slowly moving land or sea craft is small enough to be neglected. The north component of the Coriolis acceleration in the horizontal plane, i.e. the one which affects the pendulum, is proportional to twice the product of the earth's angular rate, $2\omega$, the east component of vehicle velocity, $So \sin Co$, and the sine of the latitude, $\sin \lambda$. The pendulum offset for a constant easterly speed may in itself, not be serious if the speed is not high but the changes in output with changes in speed may become serious. To prevent such errors from developing, the pendulum output is biased with a voltage proportional to $2\omega So \sin Co \sin \lambda$. To this end, the signal proportional to $2\omega So \sin Co \sin \lambda$ is subtratced from the output of the pickoff device 122 at the box marked 140.

Since the pendulum bob moves along a north-south line, any acceleration which has a north-south component will deflect the pendulum and cause precession of the gyro in azimuth until the pendulum output returns to zero. An effective correction is to bias the pendulum output with a voltage proportional to the acceleration. Another is to restrain the pendulum with an equal counter torque. However, both these methods require auxiliary equipment which would add weight to the airborne instrument.

Accordingly, it has been found preferable and desirable to reduce pendulum response to short term periodic accelerations, such as caused by buffeting for example, and to prevent the effects of extended or high accelerations from adversely affecting the gyro compass. The first feature is accomplished by damping the pendulum so heavily that it is damped above critical damping and its time constant is on the order of one minute, while the second desirable feature is accomplished by limiting the travel of the pendulum to a small angle, and disconnecting the pendulum signal from the gyro whenever that predetermined limit is reached. Due to the heavy damping, the pendulum does not return to its null position immediately upon cessation of the acceleration and, for this reason, the reconnection of the pendulum to the gyro is delayed for several time constants of the pendulum after the pendulum leaves the limit stop.

FIG. 2 shows a circuit for carrying out the above operation. The pendulum 120 is adapted to close an electrical circuit between the wire 150 and either of contacts 151 upon excessive or prolonged acceleration. The closing of this circuit energizes the relay winding 152 of an instant open-delayed close relay switch 153 by completing the circuit through the power supply 154. The output of the pendulum pickoff 122, which is modified by the Coriolis acceleration correction as previously described, is applied to one normally closed terminal 153a of the relay switch 153, the other terminal 153b of which is connected to the motors 111 and 105 through the switch 155.

Prolonged, large accelerations cause the contacts 151 to be closed by the pendulum 120 to energize relay winding 152 and thereby to open switch 153 and remove the effect of the pendulum output from the gyro motors 105 and 111. After the acceleration reduces to a value sufficient to allow the pendulum 120 to move away from contacts 151 the relay winding 152 is deenergized, but switch 153 remains open for a predetermined time period, related to the pendulum time constant, in order to allow the pendulum to approach the zero position before reconnecting the pendulum to the gyros. The delay time is preferably about two or three time constants of the pendulum.

In place of the mechanical contacts 151, the pendulum output may be employed to actuate the relay after the output of the pendulum pickoff reaches a predetermined value if desired.

Another error producing acceleration peculiar to aircraft is related to the rate-of-climb, which may be either in ascent or descent. In normal operation of the aircraft, the pilot tends to maintain constant indicated air speed to keep constant lift on the wings. This means that because of the variation in air density with altitude, the difference between true and indicated air speed is constantly changing, and the aircraft is decelerating with descent and accelerating with ascent of the craft. Since the descent and ascent occur over a considerable period of time, the pendulum is displaced from the null position for a long interval of time even though the amount of displacement is actually quite small and the pendulum may not reach the limit stops to cut out the pendulum effect from the gyro. The continued displacement will create continuous precession of the gyro from the meridian and result in intolerably large errors. In order to compensate for this effect the pendulum signal is disconnected from the gyro whenever the rate-of-climb or descent exceeds a predetermined value, for example, whenever the rate-of-climb is greater than 300 ft./min. To this end, the switch 155 of FIG. 2 is opened by energization of relay winding 156 from power supply 157 whenever the rate-of-climb reaches the predetermined selected value. For example, if the rate-of-climb indicator 158 includes a needle 159 moving over a scale 160, a set of contacts 161 may be placed at the points representing the selected value of rate of ascent and descent. An electrical circuit is completed between either of the contacts 161 and the needle 159 which causes actuation of the relay switch 155 through the energization of winding 156 to disconnect the pendulum output from the gyro during the ascent and/or descent periods. When the aircraft levels off at a constant altitude, or when the rate-of-climb drops to a small value, the relay switch 155 is closed and the pendulum again controls the gyro compass.

We claim:

1. In a gyro compass for aircraft, pendulum means for controlling said gyro compass including a pendulum, means for heavily damping said pendulum and means for disconnecting said pendulum from control of said gyro compass under sustained acceleration, said means comprising a rate of climb indicator, and means for effectively disconnecting said pendulum actuated by said rate of climb indicator whenever the rate of climb reaches a predetermined value.

2. In a gyro compass for aircraft, pendulum means for controlling said gyro compass including a pendulum, means for heavily damping said pendulum and means for disconnecting said pendulum from control of said gyro compass under sustained acceleration, limit switching means on said pendulum, a rate of climb indicator, switch means actuated by said rate of climb indicator, electrical connections between each of said switch means and said means for disconnecting said pendulum, said means for disconnecting said pendulum being actuated by either of said switching means.

3. In a gyro compass, a gyroscope supported for universal rotation in a gimbal ring, a pendulum on said gimbal ring, means for heavily damping said pendulum, means connecting said pendulum to said gyroscope for operation of said gyroscope as a compass, mechanical limit stops between said pendulum and said gimbal ring for restricting the displacement of said pendulum, means for interrupting said connecting means upon contact of said pendulum with either one of said limit stops, and means for delaying the reestablishment of said connecting means after disengagement of said pendulum and said limit stop.

4. In a gyro compass for aircraft, pendulum means for controlling said gyro compass including a pendulum, means for heavily damping said pendulum and means for disconnecting said pendulum from control of said gyro compass under sustained acceleration, and means for delaying reconnection of said pendulum upon cessation of said sustained acceleration.

5. In a gyro compass for aircraft, pendulum means for controlling said gyro compass including a pendulum, means for heavily damping said pendulum and means for disconnecting said pendulum from control of said gyro compass under sustained acceleration, said means comprising limit switches actuated by said pendulum and means operated by said limit switches to effectively disconnect the pendulum, and means for delaying reconnection of said pendulum upon cessation of said sustained acceleration.

References Cited in the file of this patent

UNITED STATES PATENTS

| | | |
|---|---|---|
| 2,419,948 | Haskins | May 6, 1947 |
| 2,657,471 | Thomas et al. | Nov. 3, 1953 |
| 2,729,108 | Vacquier | Jan. 3, 1956 |
| 2,968,956 | Agins | Jan. 24, 1961 |